US 6,684,987 B2

(12) United States Patent
Stachowski et al.

(10) Patent No.: US 6,684,987 B2
(45) Date of Patent: Feb. 3, 2004

(54) MOTOR-DRIVEN FEEDBACK MECHANISM (75) Inventors: Stephen M. Stachowski, Canton, MI (US); Kevin J. Pavlov, Livonia, MI (US); Randy C. Stevenson, Saline, MI (US)

(73) Assignee: Visteon Global Techologies, Inc., Dearborn, MI (US)

( * ) Notice: Subject to any disclaimer, the term of this patent is extended or adjusted under 35 U.S.C. 154(b) by 0 days.

(21) Appl. No.: 10/040,847

(22) Filed: Dec. 28, 2001

(65) Prior Publication Data

US 2003/0122418 A1 Jul. 3, 2003

(51) Int. Cl.$^7$ ................................................ B60T 13/74
(52) U.S. Cl. .......................... 188/156; 180/334; 74/512
(58) Field of Search ................................. 188/156, 158; 180/334; 74/512; 192/219.1–220.4

(56) References Cited

U.S. PATENT DOCUMENTS

| 4,941,553 | A | 7/1990 | Harrison |
| 5,268,624 | A | 12/1993 | Zanger ........................ 318/551 |
| 5,729,979 | A | 3/1998 | Shaw et al. |
| 5,823,636 | A | 10/1998 | Parker et al. |
| 5,927,825 | A | 7/1999 | Schenk et al. |
| 5,977,740 | A | 11/1999 | McCann |
| 6,074,019 | A | 6/2000 | Phillips et al. |
| 6,075,332 | A | 6/2000 | McCann |
| 6,105,737 | A | 8/2000 | Weigert et al. |
| 6,186,026 | B1 | 2/2001 | Shaw et al. |
| 6,213,572 | B1 | 4/2001 | Linkner, Jr. et al. |
| 6,226,586 | B1 | 5/2001 | Luckevich et al. |
| 6,267,208 | B1 | 7/2001 | Koepff |
| 6,267,456 | B1 | 7/2001 | Crombez |
| 6,272,421 | B1 | 8/2001 | Mertens |
| 2002/0134611 | A1 | * 9/2002 | Beishline et al. ........... 180/334 |

FOREIGN PATENT DOCUMENTS

| DE | 10113346 A1 | 9/2002 |
| GB | 1558283 | 12/1979 |
| GB | 2114717 A | 8/1983 |

OTHER PUBLICATIONS

Search Report of British patent application No. 0215084.5, Dec. 23, 2002, pp. 1–5.
Article entitled "Variable Rate Pedal Feel Emulator Designs for a Brake–By–Wire System," by James W. Zehnder II, Shekhar S. Kanetkar, and Craig A. Osterday, SAE Technical Paper Series 1999–01–0481, reprinted from Brake Technology and ABS/TCS Systems (SP–1413).

* cited by examiner

Primary Examiner—Christopher P. Schwartz
(74) Attorney, Agent, or Firm—Brinks Hofer Gilson & Lione (57) ABSTRACT A motor-driven feedback mechanism for a braking pedal. A pedal is linked to a shaft and a bi-directional motor capable of operating in a first and a second direction is linked to the shaft. A gearbox is driven by the bi-directional motor and the gearbox is attached to the shaft to effect rotation of the pedal. A motor controller is linked to the motor and a microprocessor capable of controlling the motor controller is linked to the motor controller. At least one sensor for measuring a parameter of the pedal and providing feedback to the microprocessor is provided.

26 Claims, 7 Drawing Sheets

Fig. 8

MOTOR-DRIVEN FEEDBACK MECHANISM

FIELD OF THE INVENTION

The invention relates generally to the field of force feedback mechanisms. In particular, this invention relates to a motor-driven feedback mechanism for providing feedback to a vehicle operator.

DESCRIPTION OF THE RELATED ART

Modern vehicular braking systems utilize brake-by-wire technology rather than hydraulic systems. In pure hydraulic braking systems, depressing the brake pedal actuates a piston in a hydraulic master cylinder. The movement of the piston in the master cylinder compresses the brake fluid which transfers the pressure to the brakes of the vehicle, typically through a booster operated by the engine vacuum. The operator receives hydraulic feedback in the form of resistance at the pedal input such as kickback and pulsations.

In a brake-by-wire system, the sensors on the brake pedal typically measure driver intent through force and displacement measurements. An electronic control unit receives signals from the sensors on the brake pedal and computes optimized braking forces. The electronic control unit signals electromechanical actuators on each wheel that apply the required pressure. No hydraulic lines are used, only electrical wires. Brake-by-wire systems provide numerous advantages including a reduction in weight, size and number of components necessary in the braking system. Electrical wiring is further more resistant to damage than hydraulic circuitry, and is more space-efficient. It is also easier to integrate advanced braking components such as ABS, traction and stability control elements via electrical systems rather than with traditional hydraulic braking systems. Typically, all that is necessary in such integrations is the addition of computer code to the electronic control unit.

Brake-by-wire systems are not without disadvantages. The most significant disadvantage is the lack of feedback of pedal resistance to the operator. Most operators appreciate this type of feedback and prefer to feel a more conventional pedal response such as kickback and pulsations upon application of the brakes. For this reason, it has become necessary to add pedal feel emulators to brake-by-wire systems to provide conventional pedal resistance. One such device is a stand-alone accumulator with movable pistons separated by a pair of springs. The springs provide improved pedal feel, but it has been noted that the feel is significantly different than conventional pedal systems.

U.S. Pat. No. 5,729,979 discloses a variable rate pedal feel emulator that improves pedal feel characteristics. Fluid is still used for semi-active pedal feedback in this mechanism, as well as a rubber spring modeled to simulate desired operator feedback.

It is desirable to further improve the feedback to an operator to make it more operator-adjustable and to further reduce the package and component size.

BRIEF SUMMARY OF THE INVENTION

In one embodiment of the present invention, a motor-driven feedback mechanism for a braking pedal is provided. A pedal is linked to a shaft and a bi-directional motor capable of operating in a first and a second direction is linked to the shaft. A gearbox is driven by the bi-directional motor and the gearbox is attached to the shaft to effect rotation of the pedal. A motor controller is linked to the motor and a microprocessor capable of controlling the motor controller is linked to the motor controller. At least one sensor for measuring a parameter of the pedal and providing feedback to the microprocessor is provided.

In a second embodiment of the present invention, a motor-driven feedback mechanism is provided. A pedal is pivotally mounted to a frame via a shaft. A bi-directional motor capable of applying resistance to rotation and assistance to rotation of the pedal is provided. A means for measuring at least one parameter of the pedal and a means for analyzing at least one parameter of the pedal are provided. A means for controlling the bi-directional motor in order to adjust the speed and direction of rotation of the bi-directional motor in response to at least one measured parameter of the pedal is provided.

In a third embodiment of the present invention, a method for providing force feedback to an operator of a shaft-mounted pedal is provided. The method comprises the steps of measuring at least one parameter of a pedal pivotally linked to a frame and analyzing this parameter to determine operator intent. A motor controller is signaled and the direction of rotation and power of a motor is variably adjusted in order to provide mechanical assistance to rotation and assistance to rotation of the pedal and shaft.

DETAILED DESCRIPTION OF THE PREFERRED EMBODIMENTS OF THE INVENTION

Figure 1:
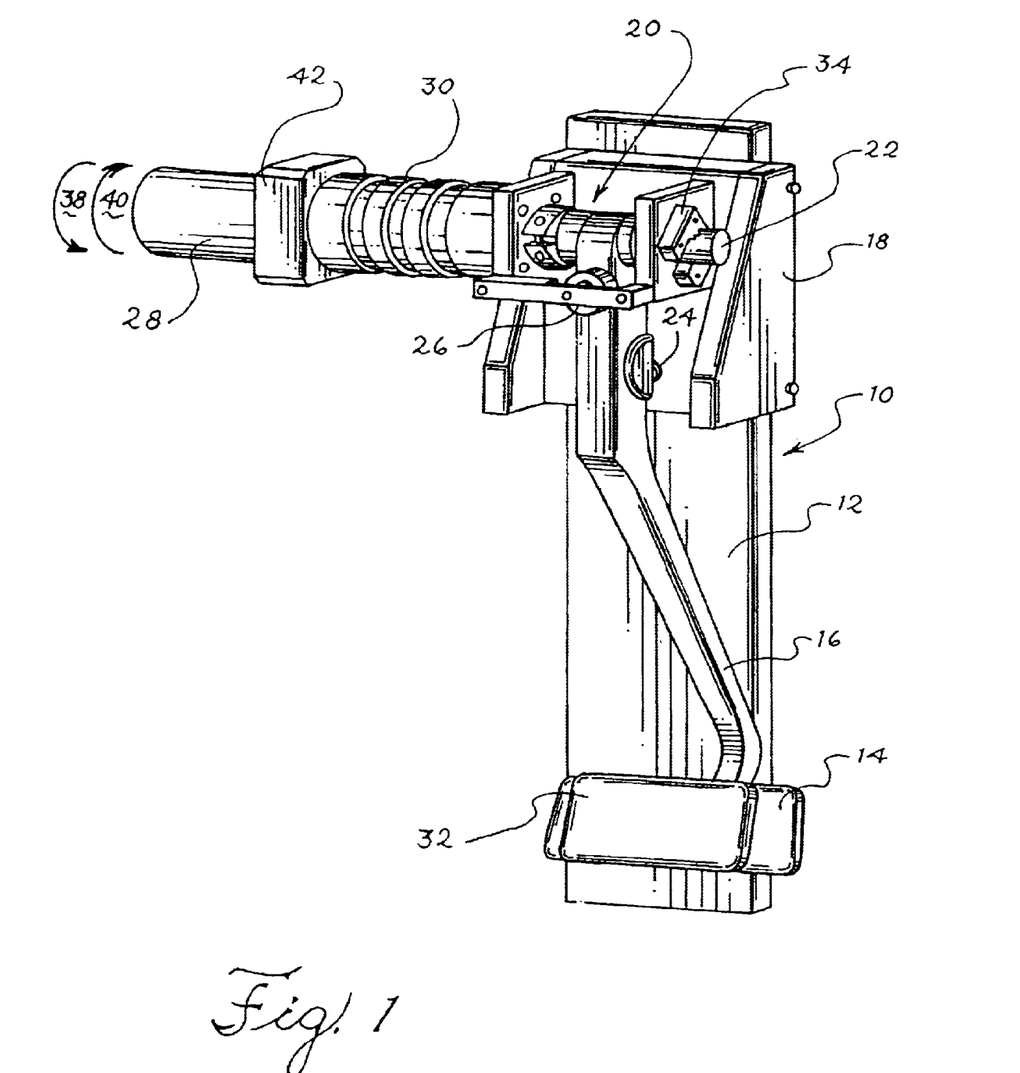
FIG. 1 is a perspective view of an embodiment of the motor-driven feedback mechanism of the present invention on a conventional brake pedal.
Figure 2:
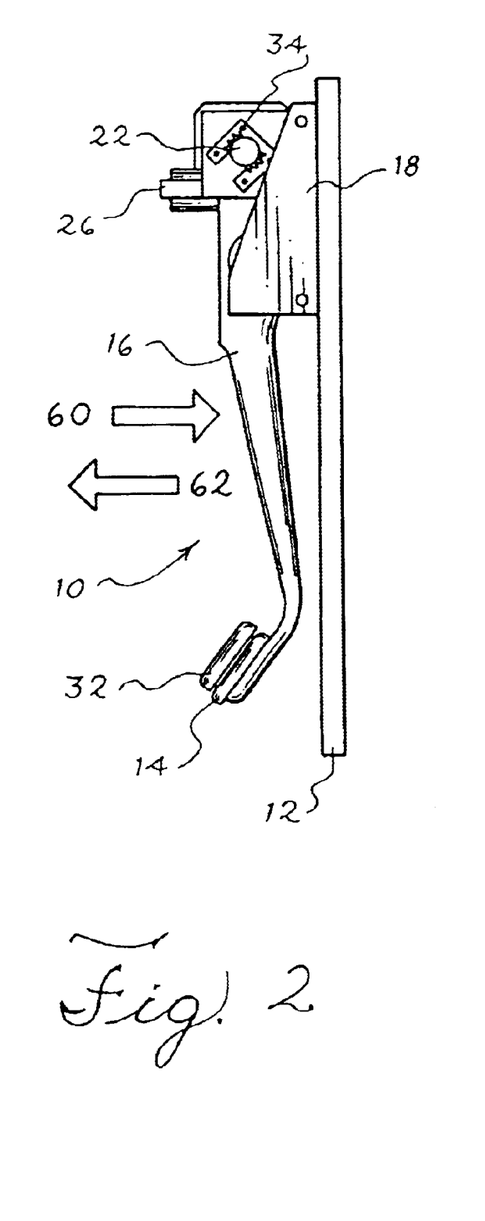
FIG. 2 is a right side plan view of the embodiment shown in FIG. 1.
Figure 3:
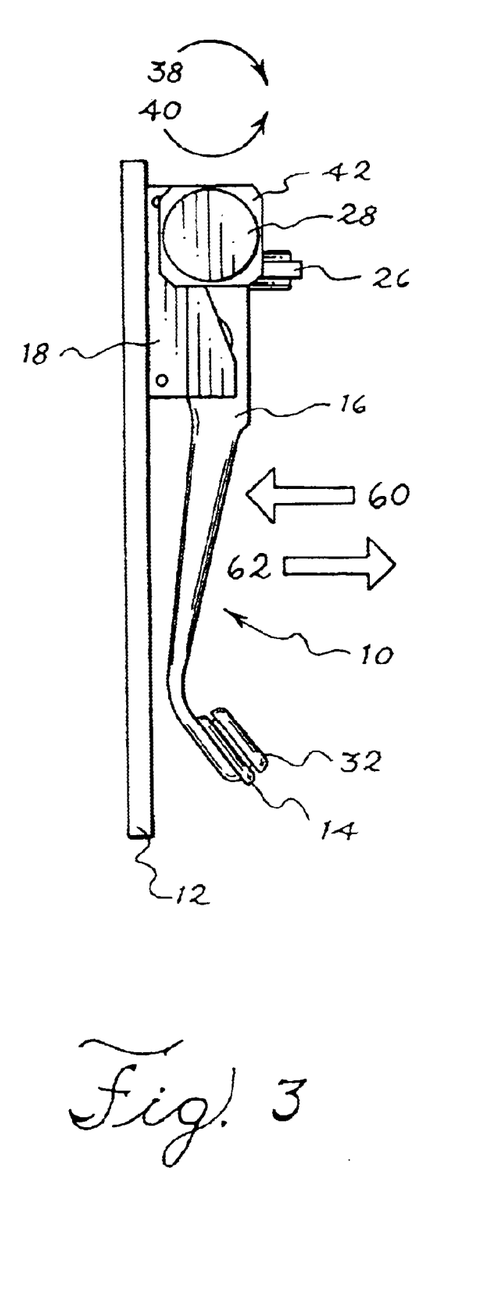
FIG. 3 is a left side plan view of the embodiment shown in FIG. 1.

Referring in combination to FIGS. 1–3, a preferred embodiment of the present invention is described. The motor-driven feedback mechanism of the present invention preferably utilizes a conventional foot-operated pedal 10, as shown in FIGS. 1–3. The conventional pedal 10 is preferably mounted on a base plate 12 and has a foot pedal 14 attached to a shaft 16. The pedal 10 may be pivotally mounted on the base plate 12 or frame (not shown) through any method commonly utilized in the art. In the Figures, it is shown attached to the base plate 12 with conventional brackets 18. The shaft 16 preferably links the foot pedal 14 to an axial shaft 22. In the Figures, the shaft 16 provides a direct link between the foot pedal 14 and the axial shaft 22, however, the foot pedal 14 could also be indirectly linked to the axial shaft 22.

The preferred embodiment of the invention also preferably includes a compression spring 24 positioned on the base plate 12 and in contact with the shaft 16 of the pedal 10. The compression spring 24 biases the shaft 16 of the pedal 10 toward a home position. When force is no longer applied to the pedal 10 by an operator, the compression spring 24 forces the pedal 10 toward the home position. It is also possible to provide a torsion spring (not shown) to achieve the same result. If a torsion spring is utilized, the torsion spring is preferably mounted around the axial shaft 22 at the point 20 where the shaft 16 meets the axial shaft 22. One end of the torsion spring is preferably in contact with the base plate 12 and the other end is preferably in contact with the shaft 16. A mechanical stop 26 is also preferably in place to define the home position. The mechanical stop 26 can be mounted in any manner known in the art, and in the Figures is shown mounted to one of the brackets 18. Upon release of downward pressure on the foot pedal 14 by the operator, the compression spring 24 (or torsion spring) biases the shaft 16 upwardly until it contacts the mechanical stop 26.

The preferred embodiment of the present invention also includes a motor 28 linked to the pedal 10. A bi-directional, DC brushless motor operating in torque mode control is the preferred type of motor for use in the invention, but the motor 28 may be any type of motor that can provide force in two directions and also operate in a stalled condition. The motor 28 is preferably connected to a gearbox 30 that is in turn connected to the axial shaft 22 of the pedal 10. The axial shaft 22 acts as the output shaft of the gearbox 30. Sensors are preferably positioned on the foot pedal 14 and the axial shaft 22. The sensor 34 on the foot pedal 14 is preferably a force transducer 32 that measures the amount of downward force an operator applies to the foot pedal 14 by measuring the pressure applied to the foot pedal 14. The sensor on the axial shaft 22 is preferably a displacement transducer 34 capable of measuring the displacement of the pedal 10 by recognizing axial rotation of the axial shaft 22. These sensors 32, 34 communicate these measurements to a microprocessor (not shown in FIGS. 1–3), that in turn analyzes the measurements and signals a motor controller (not shown in FIGS. 1–3) that controls the motor 28 to provide the desired amount of force feedback to the operator.

Figure 4:
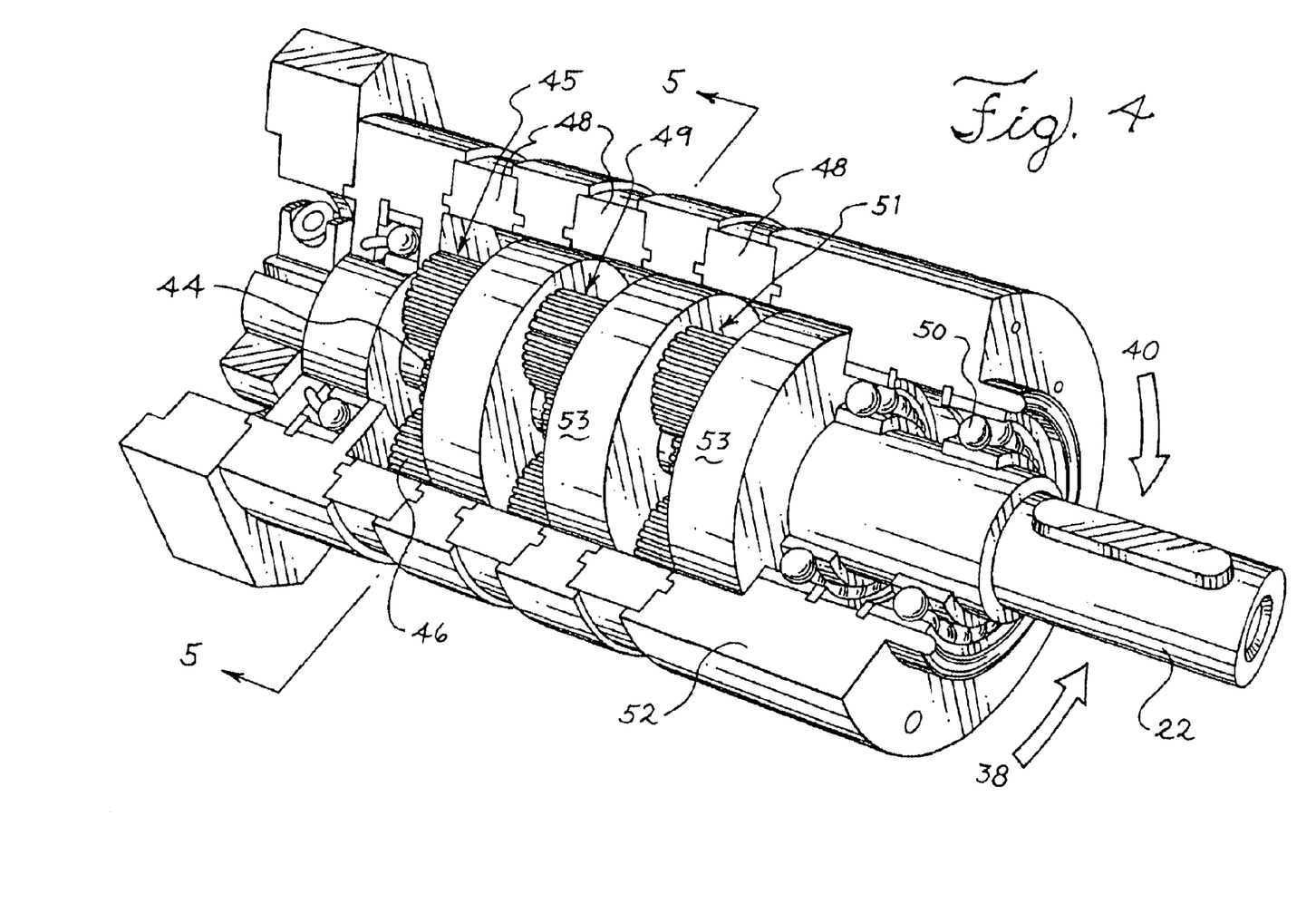
FIG. 4 is a perspective view of the interior of a gearbox for use in an embodiment of the present invention.
Figure 5:
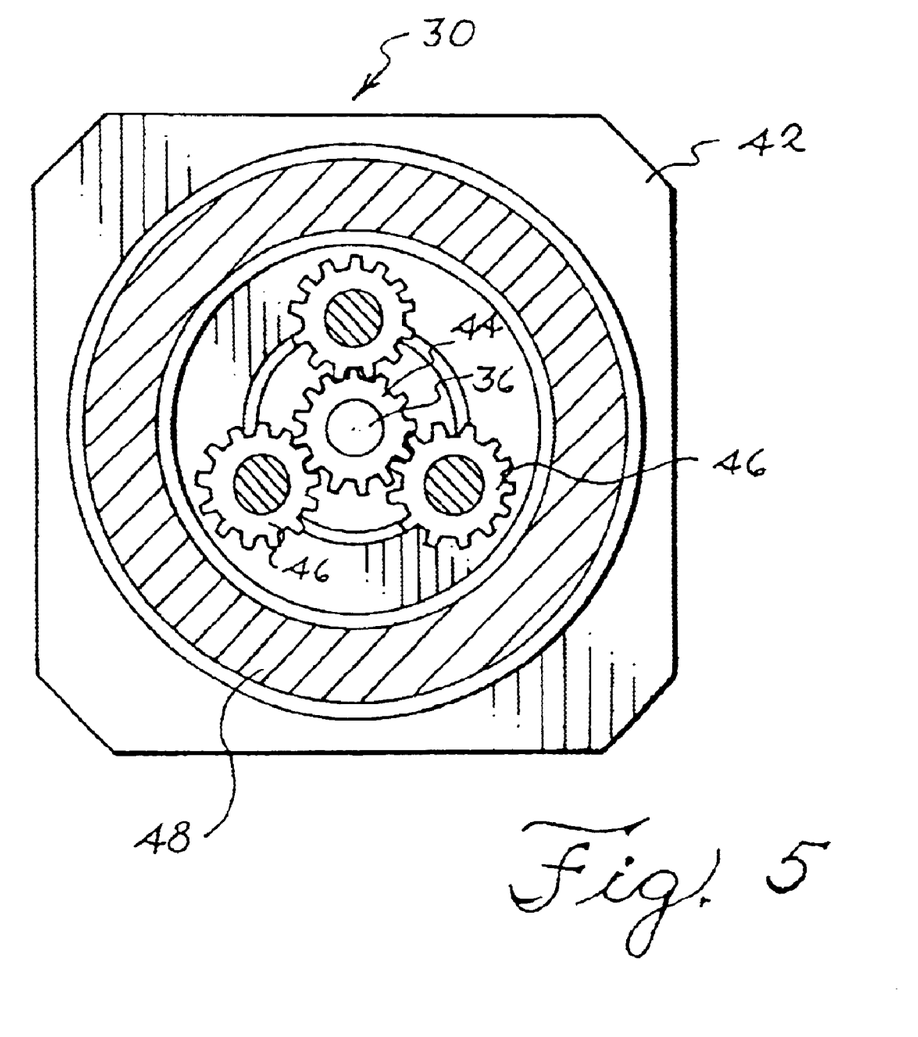
FIG. 5 is a cross-sectional view along line 5—5 of FIG. 4.

An embodiment of the gearbox 30 of the present invention is shown in greater detail in FIGS. 4 and 5. The gearbox 30 is shown in cutaway view in FIG. 4 to illustrate a three-stage planetary gear system of the preferred embodiment. The purpose of the gearbox 30 is to adjust the torque levels supplied at the input shaft 36 to appropriate levels at the axial shaft 22. In order to reduce packaging size, it is preferable to utilize a small motor 28 capable of producing an RPM level of approximately 8000 RPM, although the motor 28 operates in a stalled condition the majority of the time. Due to the size of this type of motor 28, it is necessary to utilize a gearbox 30 capable of increasing the torque power of this type of motor 28 to a point where it can be effective. A preferred gear ratio is 1:150, and is preferably accomplished through a gearbox 30 containing a three-stage planetary gearset. An input shaft 36 is attached to the motor 28 that can transfer torque in either a first direction 38 or a second direction 40. The gearbox 30 is attached to the motor 28 via a motor adaptor plate 42. The output of the gearbox 30 is preferably the axial shaft 22. The gearbox 30 preferably contains three identical stages 45, 49, 51 that operate to increase the torque supplied at the input shaft 36 from the motor 28 to the axial shaft 22. The first stage 45 preferably comprises an input shaft 36 with a sun gear 44 surrounded by three planetary gears 46. The planetary gears 46 are in contact with a ring gear 48. The input shaft 36 transfers torque in either the first 38 or the second 40 direction to the planetary gears 46 and the ring gear 48. Torque is then transferred into the second stage 49 of planetary gears 46 and then into a third stage 51 of planetary gears 46 through carriers 53. Finally, torque is transferred to the axial shaft 22 which is preferably mounted on bearings 50 to allow it to rotate relative to the casing 52 of the gearbox 30. In this manner, the torque of the motor 28 is increased to a level powerful enough to effect the rotation of the axial shaft 22 and thus the rotation of the pedal 10 by assisting or resisting rotation of the axial shaft 22. This assistance or resistance is felt by an operator and provides the desired level of force feedback.

The gearbox 30 preferably also allows the motor 28 to operate in a stalled condition. When the motor 28 is in a stalled condition, the motor 28 is not rotating in either direction and is electro-mechanically locked in place. When the motor 28 is electro-mechanically locked in place, it is possible to backdrive the motor 28 through the application of sufficient force on the pedal 10. The axial shaft 22 may still rotate with the application of enough force, and this causes the operator to feel resistance to downward motion 60 of the pedal 10. The compression spring 24 (or torsion spring) acts in conjunction with the stalled motor 28 to provide a mechanism to provide some resistance to downward motion 60 of the pedal 10 if power is discontinued to the motor 28. In this situation, the compression spring 24 (or torsion spring) still biases the pedal 10 toward its home position.

Figure 6:
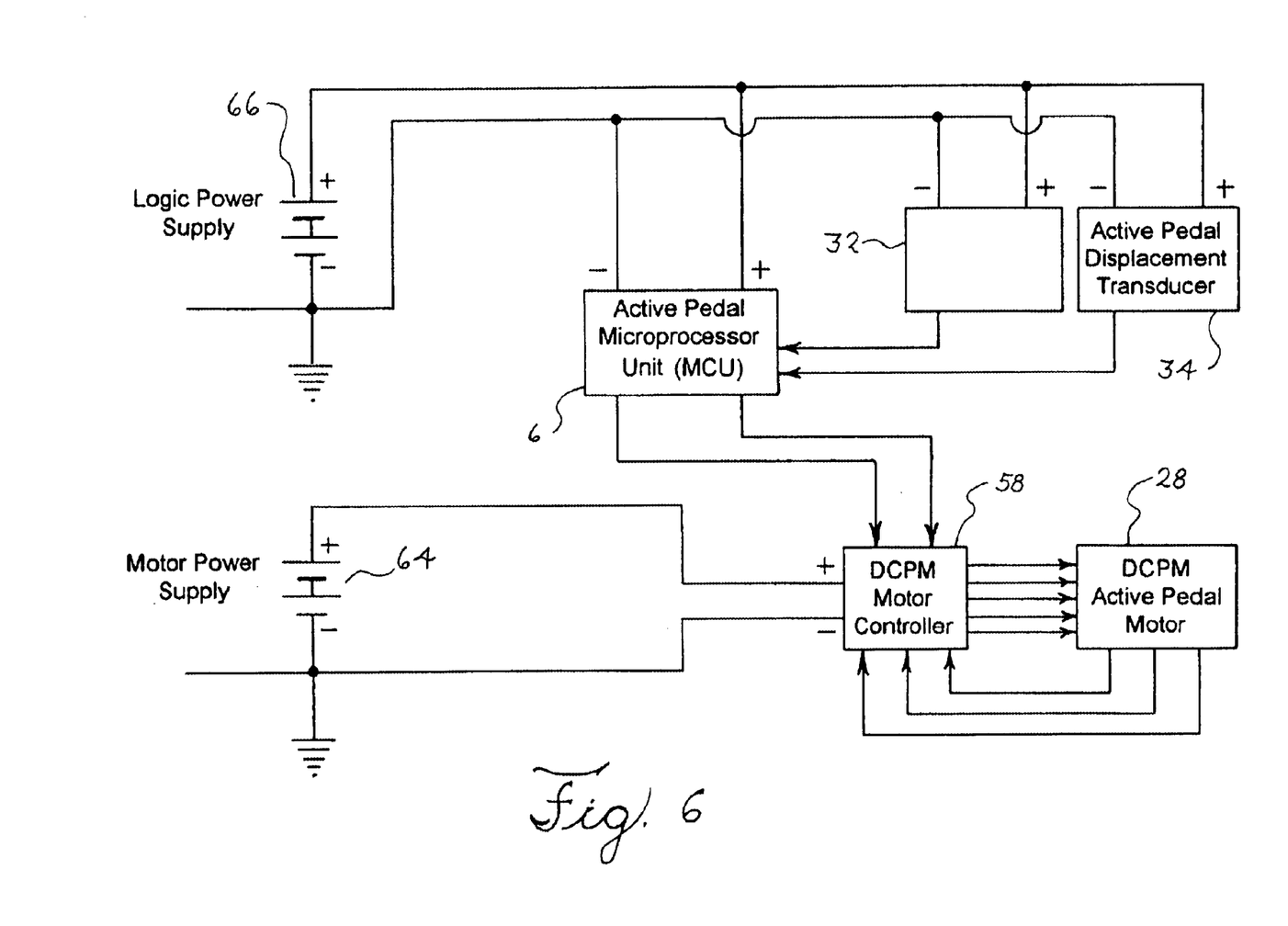
FIG. 6 is an electrical systems schematic showing a stand-alone embodiment of the present invention.
Figure 7:
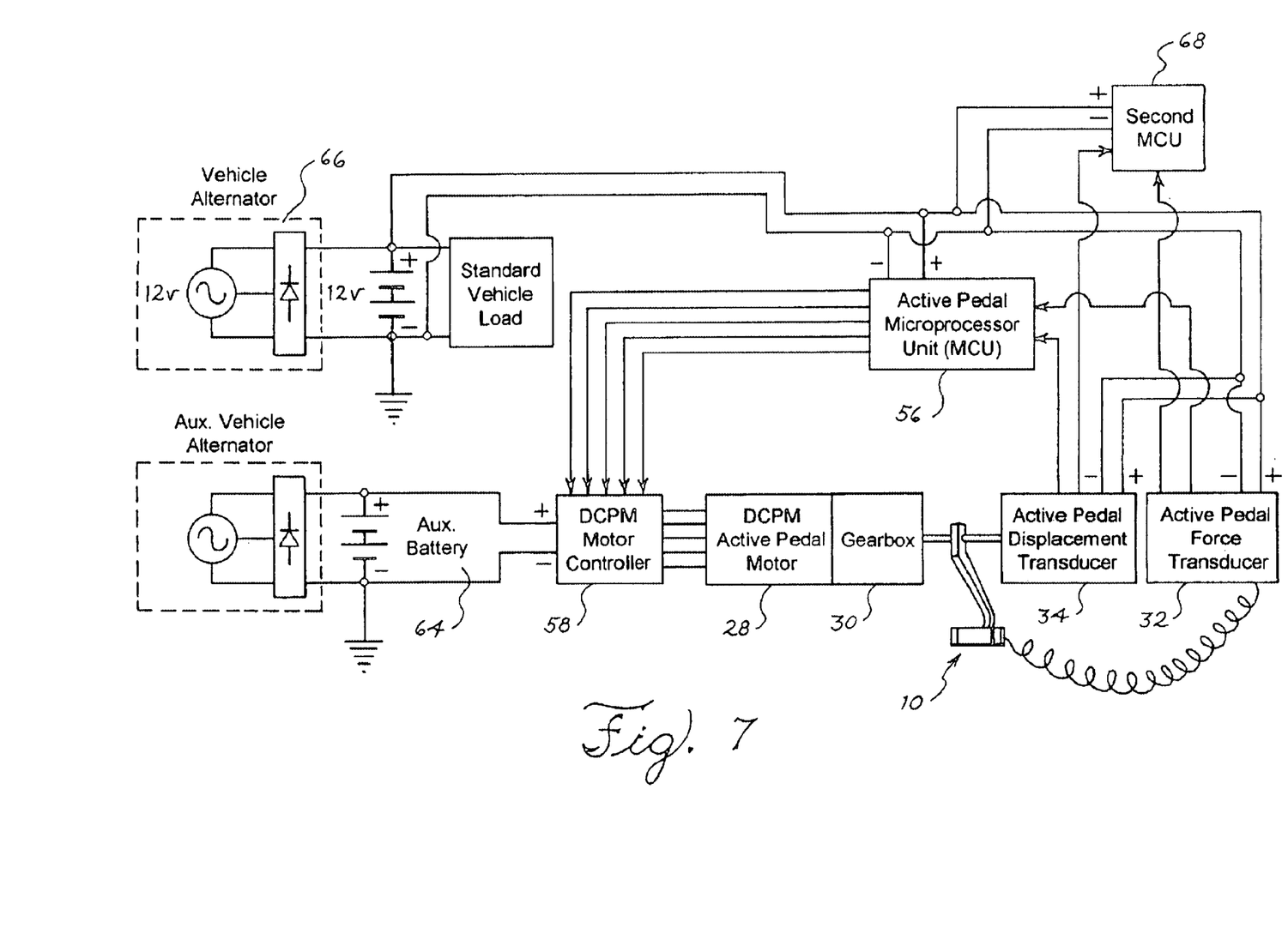
FIG. 7 is an electrical systems schematic showing an embodiment of the present invention in a brake-by-wire application.

This active pedal system of the present invention can be used in a brake-by-wire system as well as in any other system where the pedal 10 can be mechanically decoupled from the brake actuating system. For example, the active pedal system of the present invention can replace a conventional vacuum assisted brake pedal in a hydraulic brake system. A mechanical interface to the vacuum booster is no longer necessary when the present invention is incorporated into a hydraulic brake system. The mechanism of operation of the preferred embodiment of the present invention will be described with reference to the schematic diagrams shown in FIGS. 6 and 7. FIG. 6 shows the mechanism of the present invention in stand-alone form while FIG. 7 shows the mechanism of the present invention in a brake-by-wire system.

The sensors 32, 34 of the preferred embodiment of the invention are force 32 and displacement 34 transducers. The force transducer 32 is preferably a pressure-sensitive sensor on the foot pedal 14. This sensor 32 measures the amount of pressure applied to the foot pedal 14 by an operator. The displacement transducer 34 is preferably positioned on the axial shaft 22 of the pedal 10 so that it can measure the rotation of the axial shaft 22. The displacement transducer 34 relays information about the speed of rotation and distance of rotation to a first microprocessor 56. The force transducer 32 also relays information relating to the sensed pressure to the first microprocessor 56. The first microprocessor 56 uses an internal algorithm in combination with the measurements it receives from the transducers 32, 34 to calculate the amount of force that the motor 28 should apply to the pedal 10 in the form of rotational assistance or rotational resistance. If rotational assistance is required, the microprocessor 56 signals a motor controller 58 which causes the motor 56 to rotate the input shaft 36 in a first direction 38. By rotating in a first direction 38, the input shaft 36 causes the axial shaft 22, and thus the pedal 10, to rotate in a downward direction, shown by an arrow 60. This rotational assistance causes the operator to feel as if there is relatively little or no resistance to rotation of the pedal 10.

If rotational resistance is required, the microprocessor 56 signals the motor controller 58 to rotate the motor 28, and thus the axial shaft 22, in a second direction 40. Rotation in the second direction 40 causes the axial shaft 22, and thus the pedal 10, to rotate in an upward direction, shown by an arrow 62. This rotational resistance causes the operator to feel more resistance to pressure applied to the pedal 10. If desired, kickback or pulsations of the pedal 10 can be provided through rapid oscillation of the direction of rotation of the motor 28. The levels of both the rotational resistance and assistance provided by the motor 28 are preferably adjustable by varying the power supplied to the motor 28.

The motor controller 58 is shown attached to a power supply 64, which can be any type of power supply known in the art. The microprocessor 56 is shown attached to a logic power supply 66, which can be any type of power supply known in the art.

In FIG. 7, an embodiment of the present invention is shown in a brake-by-wire system. In this embodiment, the mechanism operates in the same manner as previously described, but the force 32 and displacement 34 transducers also signal a second microprocessor 68. These signals communicate driver intent information to the second microprocessor 68 which contains the core operating algorithm of the brake-by-wire system. The second microprocessor 68 actuates the brakes of the vehicle in a manner known in the art.

The following is an example of the assistance or resistance to rotation that can be provided by the mechanism of the present invention under emergency conditions. The mechanism can be adjusted in order to provide an infinite number of force feedback profiles. Typical pedal 10 movement utilizing a 16 inch shaft 16 has a travel of approximately 4 to 5 inches circumferentially which translates to a rotation of the axial shaft 22 of approximately 12°. Under emergency braking conditions, it is expected that an operator will take approximately 200 milliseconds to rotate the axial shaft 22 approximately 12°. This translates into an RPM of about 10. At its maximum speed, the geared output at the axial shaft 22 of the mechanism is approximately 20 RPM. When the motor 28 is operating at its maximum speed in the first direction 38, response will exceed operator reaction by a factor of approximately two.

The typical force applied to the foot pedal 14 under aggressive braking conditions has been shown not to exceed 100 N. The preferred embodiment of the mechanism of the present invention is designed to exceed this requirement with approximately 30% of the torque delivered by the compression spring 24 (or torsion spring) and the remaining 70% of the torque delivered by the motor 28 and gearbox 30. This results in resistance to downward motion 60 of the pedal 10.

Figure 8:
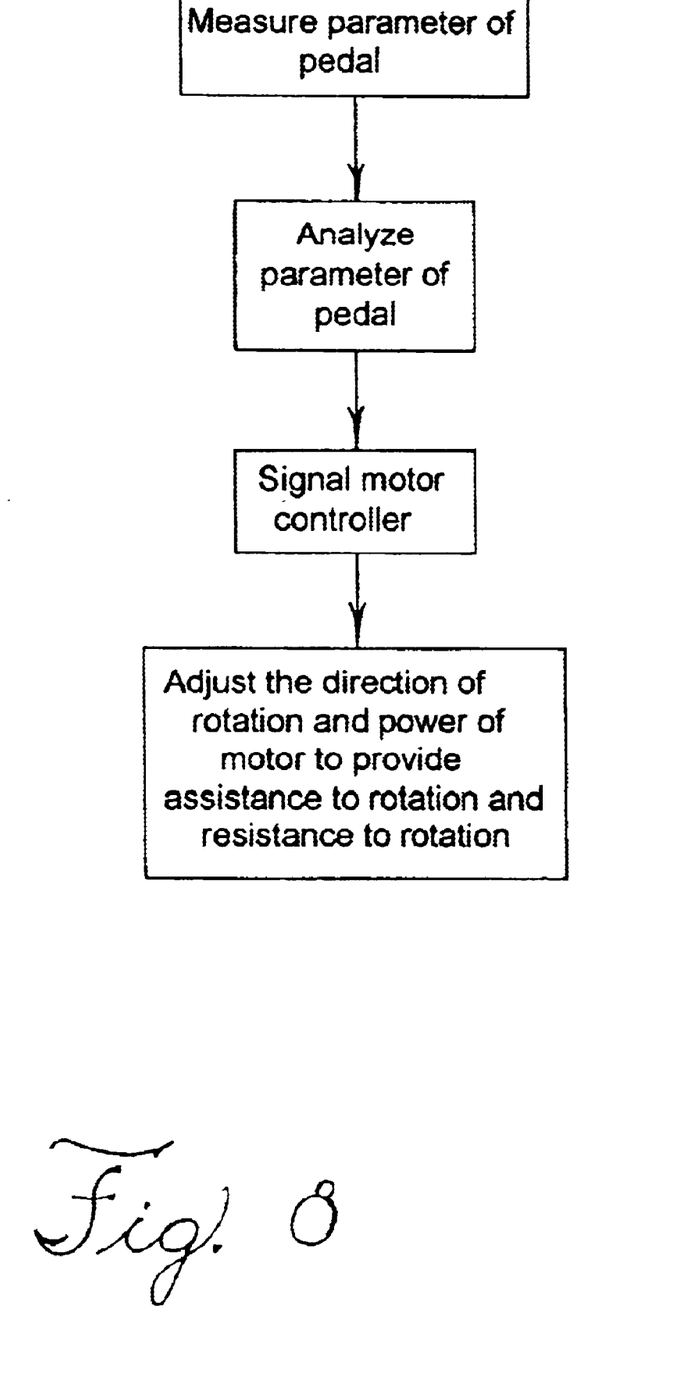
FIG. 8 is a flow chart showing the steps of the method of the present invention.

The present invention also encompasses a method for providing force feedback to an operator as shown in FIG. 8. At least one movement or force parameter of a pedal 10 pivotally mounted to a frame (not shown) via an axial shaft 22 is measured by a sensor. These measurements are communicated to a microprocessor 56 and analyzed in order to determine operator intent. The microprocessor 56 signals a motor controller 58 which variably adjusts the direction of rotation and power of a motor 28 to provide either assistance or resistance to rotation of the pedal 10. In this manner, the operator receives the appropriate amount of force feedback through the feel of the pedal 10 when force is applied to it.

The present invention is entirely active, and can be adjusted to provide any feedback profile the operator desires. The active nature of the present invention provides a significant advantage over the passive systems in the prior art. In passive systems, only the force provided by the operator on the pedal is used to supply the feedback. With the active system of the present invention, the motor 28 allows the introduction of external energy to the system. This external energy supplied by the motor 28 allows for a greater variation and more precise control of feedback profiles. These profiles can be set by the manufacturer, or they can be adjusted by the operator through adjusting mechanisms provided in the vehicle. The present invention allows retrofitting of conventional pedal architectures, and enables a physical disconnect of the pedal from the force feedback system. This eliminates package constraints as component location becomes less of an issue in the design. The present invention can also provide feedback from other systems such as mechanical throttle systems, clutch systems, or interactive video interfaces in the gaming industry. More sensors could be added to the present invention to allow it to provide force feedback regarding vehicle stability and road conditions. This feedback could be delivered through pedal movements and adjustable return forces.

It should be noted that there could be a wide range of changes made to the present invention without departing from its scope. For example, the gearbox 30 could contain a different gearing system in order to match the requirements of the motor 28. For example, a larger motor capable of higher RPM could be used and would require a gearbox with a lower gear ratio. Other motors known in the art could be utilized rather than a DC brushless motor 28. Many types of sensor means could be used to provide measurements to the microcontroller 56, and these sensor means could be positioned in a multitude of locations, depending on the type of sensor means. The sensors described can be used in conjunction with other sensors that provide measurements to a second microprocessor 68 that controls the brakes, or one set of sensors could provide the measurements to both microprocessors. It is also possible to utilize one microprocessor to both control the feedback mechanism of the present invention and the braking system itself. The motor controller 58 could also be integrated into the microprocessor 56 in order to reduce packaging size. Thus, it is intended that the foregoing detailed description be regarded as illustrative rather than limiting and that it be understood that it is the following claims, including all equivalents, which are intended to define the scope of the invention.

What is claimed is:

1. A motor-driven feedback mechanism for a braking pedal, said mechanism comprising:

a pedal linked to a shaft;

a bi-directional motor capable of operating in a first and a second direction and linked to said shaft;

a gearbox driven by said bi-directional motor and attached to said shaft to effect rotation of said pedal;

a motor controller linked to said motor;

at least a first microprocessor linked to said motor controller and being capable of controlling said motor controller;

at least one sensor for measuring a parameter of said pedal and providing feedback to said first microprocessor; and wherein said parameter is a force applied to said pedal by an operator.

2. The motor-driven feedback mechanism for a braking pedal of claim 1, wherein when said motor is operating in said first direction, said motor assists rotation of said pedal in a first direction and when said motor is operating in said second direction, said motor resists rotation of said pedal in said first direction.

3. The motor-driven feedback mechanism for a braking pedal of claim 1, wherein said rotation of said pedal provides feedback to an operator of a vehicle.

4. The motor-driven feedback mechanism for a braking pedal of claim 3, wherein said motor further comprises a DC permanent magnet brushless motor.

5. The motor-driven feedback mechanism for a braking pedal of claim 4, wherein said motor operates in a stalled condition.

6. The motor-driven feedback mechanism for a braking pedal of claim 5, wherein said gearbox further comprises a planetary gear system.

7. The motor-driven feedback mechanism for a braking pedal of claim 6, wherein said gearbox increases torque applied to said shaft by said motor.

8. The motor-driven feedback mechanism for a braking pedal of claim 7, wherein said planetary gear system further comprises a three-stage planetary gear system.

9. The motor-driven feedback mechanism for a braking pedal of claim 8, wherein at least one of said sensors measures the displacement of said pedal upon actuation of said pedal.

10. The motor-driven feedback mechanism for a braking pedal of claim 9, wherein said first microprocessor controls the effect of said motor on said rotation of said pedal by measuring the force applied to said pedal and the displacement of said pedal through feedback supplied by said sensors.

11. The motor-driven feedback mechanism for a braking pedal of claim 10, wherein said sensors provide feedback to a second microprocessor and said second microprocessor controls the brake actuators of the vehicle.

12. The motor-driven feedback mechanism for a braking pedal of claim 11, further comprising a spring to bias said pedal toward a home position.

13. The motor-driven feedback mechanism for a braking pedal of claim 12, wherein said spring further comprises a compression spring.

14. The motor-driven feedback mechanism of claim 13, further comprising a mechanical stop defining said home position of said pedal.

15. The motor-driven feedback mechanism for a braking pedal of claim 12, wherein said spring further comprises a torsion spring.

16. A motor-driven feedback mechanism, said mechanism comprising:
  a pedal pivotally mounted to a frame via a shaft;
  a bi-directional motor capable of applying resistance to rotation and assistance to rotation of said pedal;
  a means for measuring a least one parameter of said pedal;
  a means for analyzing said at least one parameter of said pedal; and
  a means for controlling said bi-directional motor to adjust the direction and speed of said bi-directional motor in response to said at least one measured parameter of said pedal.

17. The motor-driven feedback mechanism of claim 16, wherein said means for measuring at least one parameter of said pedal is a sensor measuring the force applied to said pedal.

18. The motor-driven feedback mechanism of claim 17, wherein a second means for measuring at least one parameter of said pedal is a sensor measuring the displacement of said pedal.

19. The motor-driven feedback mechanism of claim 18, wherein said means for analyzing said at least one parameter of said pedal position further comprises a microprocessor receiving signals from said sensors.

20. The motor-driven feedback mechanism of claim 19, wherein said means for controlling said bi-directional motor is said microprocessor, said microprocessor controlling the direction of rotation and power of said bi-directional motor through a motor controller.

21. The motor-driven feedback mechanism of claim 20, further comprising a gearbox driven by said bi-directional motor and linked to said pedal.

22. The motor-driven feedback mechanism of claim 21, wherein said sensors provide measurements to a second microprocessor which controls a braking system of a vehicle.

23. A method for providing force feedback to an operator of a shaft-mounted pedal, said method comprising the steps of:
  measuring at least one parameter of a pedal pivotally linked to a frame;
  analyzing said at least one parameter to determine operator intent;
  signaling a motor controller; and
  variably adjusting the direction of rotation and power of a motor to provide mechanical assistance to rotation and resistance to rotation of said pedal and shaft.

24. The method of claim 23, wherein said step of measuring said at least one parameter is performed by a first sensor measuring the rotational displacement of said pedal and a second sensor measuring the force applied to said pedal by an operator.

25. The method of claim 24, wherein said step of analyzing at least one parameter of said pedal is performed by a microprocessor.

26. The method of claim 25, wherein said motor is a bi-directional motor attached to said pedal.

* * * * *

UNITED STATES PATENT AND TRADEMARK OFFICE
CERTIFICATE OF CORRECTION

PATENT NO. : 6,684,987 B2  Page 1 of 1
DATED : February 3, 2004
INVENTOR(S) : Stephen M. Stachowski et al.

It is certified that error appears in the above-identified patent and that said Letters Patent is hereby corrected as shown below:

Column 7,
Line 2, delete "claim 1," and substitute -- claim 2, -- in its place.

Signed and Sealed this

Seventh Day of September, 2004

JON W. DUDAS
*Director of the United States Patent and Trademark Office*